(12) United States Patent
Kawakubo et al.

(10) Patent No.: US 8,511,191 B2
(45) Date of Patent: Aug. 20, 2013

(54) RACK SHAFT SUPPORT DEVICE

(75) Inventors: Akitake Kawakubo, Nara (JP);
Yoshinori Suzuki, Okazaki (JP);
Hirofumi Ishimi, Katsuragi (JP); Yoshio Kondo, West Bloomfield, MI (US)

(73) Assignee: JTEKT Corporation, Osaka-shi (JP)

( * ) Notice: Subject to any disclaimer, the term of this patent is extended or adjusted under 35 U.S.C. 154(b) by 483 days.

(21) Appl. No.: 12/461,011

(22) Filed: Jul. 29, 2009

(65) Prior Publication Data

US 2010/0024583 A1 Feb. 4, 2010

(30) Foreign Application Priority Data

Jul. 31, 2008 (JP) ................................. 2008-198574

(51) Int. Cl.
*B62D 3/12* (2006.01)
(52) U.S. Cl.
USPC .......................... 74/409; 74/422; 280/93.514
(58) Field of Classification Search
USPC ................ 74/388 PS, 409, 422; 280/93.513, 280/93.514; 384/40, 57
See application file for complete search history.

(56) References Cited

U.S. PATENT DOCUMENTS

| 2,675,225 | A | * | 4/1954 | Migny | 267/162 |
| 4,095,482 | A | * | 6/1978 | Kirschner | 74/498 |
| 4,817,921 | A | * | 4/1989 | Stevenson | 267/33 |
| 7,487,984 | B1 | * | 2/2009 | Lemont et al. | 280/93.514 |
| 2007/0209463 | A1 | * | 9/2007 | Song et al. | 74/388 PS |

FOREIGN PATENT DOCUMENTS

| JP | U-55-120565 | 2/1979 |
| JP | A-2007-238089 | 9/2007 |

OTHER PUBLICATIONS

Nov. 22, 2012 Office Action issued in Japanese Patent Application No. 2008-198574 (with translation).

* cited by examiner

*Primary Examiner* — William C Joyce
(74) *Attorney, Agent, or Firm* — Oliff & Berridge, PLC (57) ABSTRACT

A rack shaft support device includes: a rack shaft support member that is accommodated inside a retention hole formed in a housing so as to slide in an axial direction of the retention hole, and slidably supports a rack shaft; a sealing member fixed to an inlet port of the retention hole; an intermediate member that is interposed between the rack shaft support member and the sealing member; a torsion spring that couples the sealing member and the intermediate member; a cam mechanism that converts a rotational force of the intermediate member induced by untwisting of the torsion spring to a force by which the intermediate member pushes the rack shaft support member; an opposing portion that opposes a rear surface of the rack shaft support member; and an annular elastic member that is interposed between the rear surface of the rack shaft support member and the opposing portion.

17 Claims, 10 Drawing Sheets

RACK SHAFT SUPPORT DEVICE

The disclosure of Japanese Patent Application No. 2008-198574 filed on Jul. 31, 2008 including the specification, drawings and abstract is incorporated herein by reference in its entirety.

BACKGROUND OF THE INVENTION

1. Field of the Invention

The invention relates to a rack shaft support device.

2. Description of the Related Art

A steering apparatus of a rack-and-pinion system contains a rack shaft support device for removing backlash between the rack and the pinion. In the rack shaft support device, a support yoke that can slide back and forth and a compression coil spring that biases the support yoke are accommodated in a retention hole provided in a housing. By the support yoke biased by the compression coil spring, the rack shaft is axially slidably supported and also the rack shaft is pushed toward the pinion shaft.

However, as wear of the sliding portions of the rack shaft and support yoke advances in a long-term use, the play of the support yoke in the back-forth direction increases. As a result, there is the risk of generation of a rattling sound. Accordingly, a support yoke gap compensation device for inhibiting the back-forth play of the support yoke has been proposed (see, for example, Japanese Patent Application Publication No. 2007-238089 (JP-A-2007-238089)).

This support yoke gap compensation device is provided with a support yoke having a fixing groove, a yoke spring that provides a biasing force for pushing the support yoke toward a rack bar, a first cam that is disposed at the rear surface of the support yoke and has a first incline surface, a fixing member that is fitted in the fixing groove and maintains a gap between the support yoke and the first cam, a second cam that has a second inclined surface opposite the first inclined surface and a first groove formed in the central portion, a yoke plug having a second groove formed in the central portion, and a torsion spring disposed in a space between the first groove and the second groove. When a gap forms between the rack bar and the pinion, the second cam is rotated by the extension of the torsion spring and the gap is compensated.

In JP-A-2007-238089, the yoke spring presses the second cam against the yoke plug via the first cam. Consequently, when the second cam rotates due to the action of the torsion spring, there is the risk of rotation of the second cam being inhibited by the effect of frictional force generated between the second cam and the yoke plug. As a result, there are cases in which rattling sound cannot be prevented. Therefore, although it is conceivable to eliminate the yoke spring, in such a case, fluctuations in the amount of backlash attributable to fluctuations in meshing between the pinion and rack shaft cannot be absorbed, thereby resulting in the risk of an excessive increase in steering resistance.

SUMMARY OF THE INVENTION

An object of the invention is to provide a rack shaft support device capable of absorbing fluctuations in meshing while also being able to reliably inhibit the generation of sound over a long period of time.

The rack shaft support device as claimed in a first aspect of the invention includes: a rack shaft support member that is accommodated inside a retention hole formed in a housing so as to be able to slide in an axial direction of the retention hole, and slidably supports a rack shaft, wherein the rack shaft support member includes a front surface that supports the rack shaft and a rear surface located on an opposite side to the front surface in the axial direction of the retention hole; a sealing member fixed to an inlet port of the retention hole; an intermediate member that is interposed between the rack shaft support member and the sealing member and can rotate about a central axial line of the retention hole; a torsion spring that couples the sealing member and the intermediate member and is able to rotationally drive the intermediate member; a cam mechanism that converts a rotational force of the intermediate member induced by untwisting of the torsion spring to a force by which the intermediate member pushes the rack shaft support member; an opposing portion that opposes the rear surface of the rack shaft support member; and an annular elastic member interposed between the rear surface of the rack shaft support member and the opposing portion to provide a gap between the rear surface of the rack shaft support member and the opposing portion.

The intermediate member is rotated by the torsion spring accompanying progression of wear between the sliding portions of the rack shaft support member and the rack shaft. Since the intermediate member pushes the rack shaft support member towards the rack shaft by the action of the cam mechanism accompanying rotation of the intermediate member, pushing force of the meshing portions of the rack and pinion can be maintained roughly constant. Thus, generation of rattling sound can be inhibited over a long period of time. Moreover, fluctuations in meshing between the rack and pinion can be absorbed by increasing or decreasing the amount of the gap formed between the rack shaft support member and the opposing portion accompanying expansion and contraction of the annular elastic member. Thus, even after the intermediate member has moved the rack shaft support member towards the rack shaft due to the action of the torsion spring accompanying the progression of wear between the sliding portions as described above, backlash between the rack and pinion is made to be extremely low, thereby preventing steering resistance from becoming excessively large.

The opposing portion may also be an intermediate member. In this case, a cam surface and cam follower surface, for example, composing the cam mechanism are provided on opposing portions of the sealing member and the intermediate member, respectively. In addition, the opposing portion may also be an interposing member (opposing member) interposed between the intermediate member and the rack shaft support member. In this case, the cam surface and the cam follower surface, for example, composing the cam mechanism may be provided on opposing portions of the sealing member and the intermediate member, respectively, or may be provided on opposing portions of the intermediate member and the interposing member, respectively.

In addition, in the rack shaft support device as claimed in the above-mentioned aspect, an annular concave portion may be formed in the rear surface of the rack shaft support member, the annular elastic member may be held in the annular concave portion, the cross-sectional shape of the annular elastic member may be quadrangular, and the annular elastic member may have an annular flat surface opposing the opposing portion. In this case, the annular elastic member is able to secure a large surface area that makes sliding contact with the opposing portion (or with an annular plate to be described later in the case an annular plate is interposed between the intermediate member and the annular elastic member), thereby making it possible to prevent permanent set in fatigue of the annular elastic member and improve durability of the annular elastic member.

In addition, in the rack shaft support device as claimed in the above-mentioned aspect, the opposing portion may be an opposing member separate from the intermediate member, the opposing member may be provided between the front surface of the rack shaft support member and the intermediate member, and a site of the opposing member that opposes the intermediate member may include a friction reducing element. In this case, the intermediate member is able to rotate smoothly. The friction reducing element may be a low friction coating layer coated on the surface of the annular elastic member or a projection provided on the opposing member, or a lubricant.

In addition, in the rack shaft support device as claimed in the above-mentioned aspect, the opposing member may be an annular plate, the annular plate may respectively include a first surface and a second surface in the axial direction of the annular plate, the first surface of the annular plate may contact the annular elastic member, the second surface of the annular plate may contact the intermediate member, and frictional force between the second surface of the annular plate and the intermediate member may be made to be smaller than the frictional force between the first surface of the annular plate and the annular elastic member. In this case, during rotation of the intermediate member, sliding contact is made between the intermediate member and the second surface of the annular plate for which frictional force is relatively small. As a result, the intermediate member is able to rotate smoothly as required.

In order to reduce frictional force between the second surface of the annular plate and the intermediate member, the surface properties of the second surface may be improved over those of the first surface such as by improving the roughness accuracy (enhancing smoothness) of the second surface, and zinc plating, fluororesin coating or other surface treatment for reducing the friction coefficient may be carried out on the second surface. The surface area of which sliding contact is made with the intermediate member may also be reduced by providing annular projections in the second surface, or a lubricant such as grease may be interposed between the second surface and the intermediate member.

In addition, the above-mentioned rack shaft support device may be applied to a vehicle steering apparatus that supports a rack shaft so as to be able to slide in the axial direction. In this aspect, a vehicle steering apparatus is achieved that is capable of inhibiting increases in steering resistance by absorbing fluctuations in meshing between the rack and pinion, and preventing the generation of rattling sound over a long period of time.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
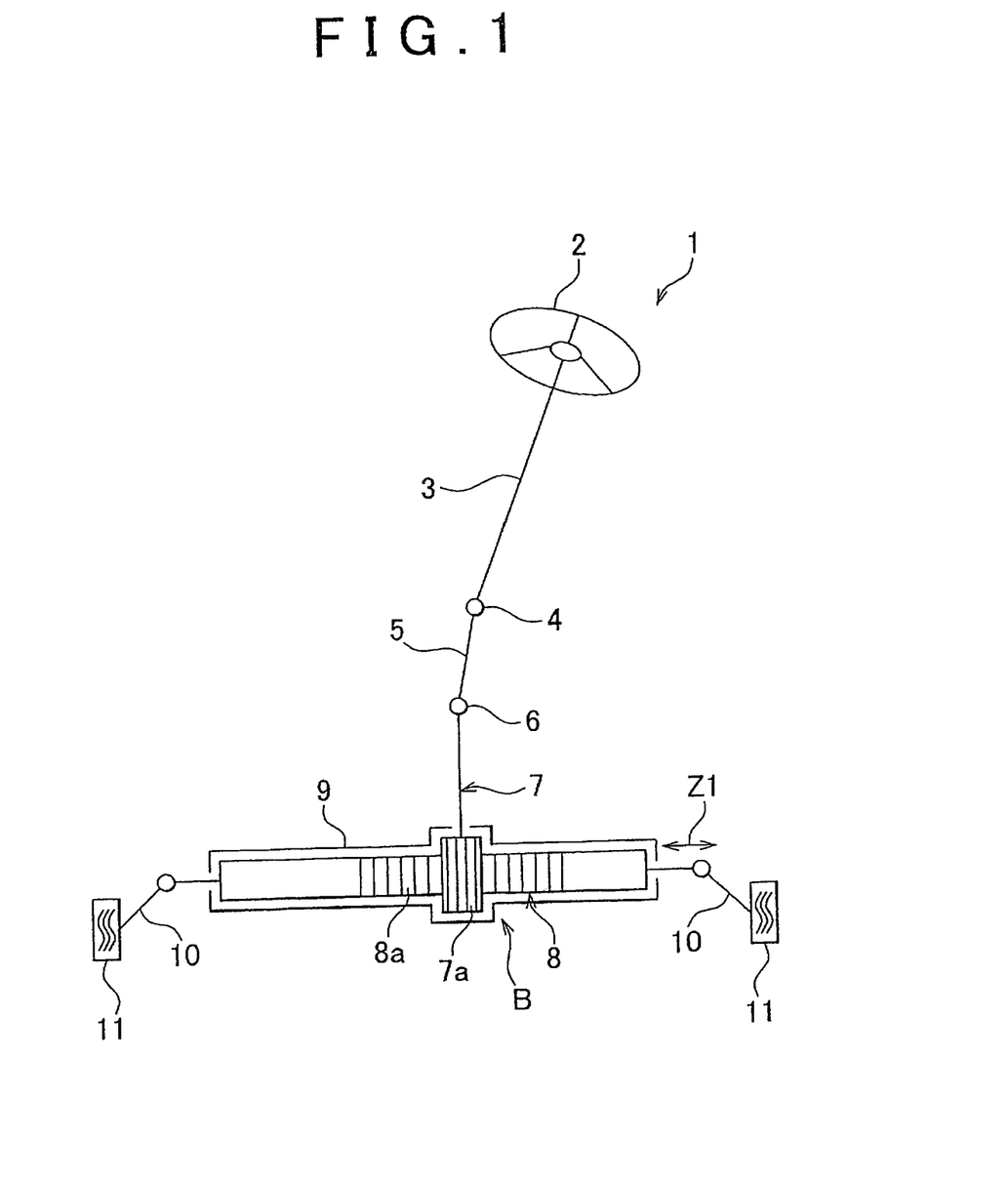
FIG. 1 is a schematic diagram showing the general configuration of a rack and pinion vehicle steering apparatus of a first embodiment of the invention.

The following provides an explanation of embodiments of the invention with reference to the appended drawings. With reference to FIG. 1, a vehicle steering apparatus 1 includes a steering shaft 3 that is coupled to a steering member 2 such as a steering wheel, an intermediate shaft 5 that is coupled via a universal joint 4 to the steering shaft 3, a pinion shaft 7 that is coupled via a universal joint 6 to the intermediate shaft 5, and a rack shaft 8. The rack shaft 8 includes a rack 8*a* that meshes with a pinion 7*a* provided on the end portion of the pinion shaft 7. In addition, the rack 8 functions as a steering shaft extending in the transverse direction of an automobile. A rack-and-pinion mechanism B serving as a steering mechanism is composed by the pinion shaft 7 and the rack shaft 8.

Figure 2:
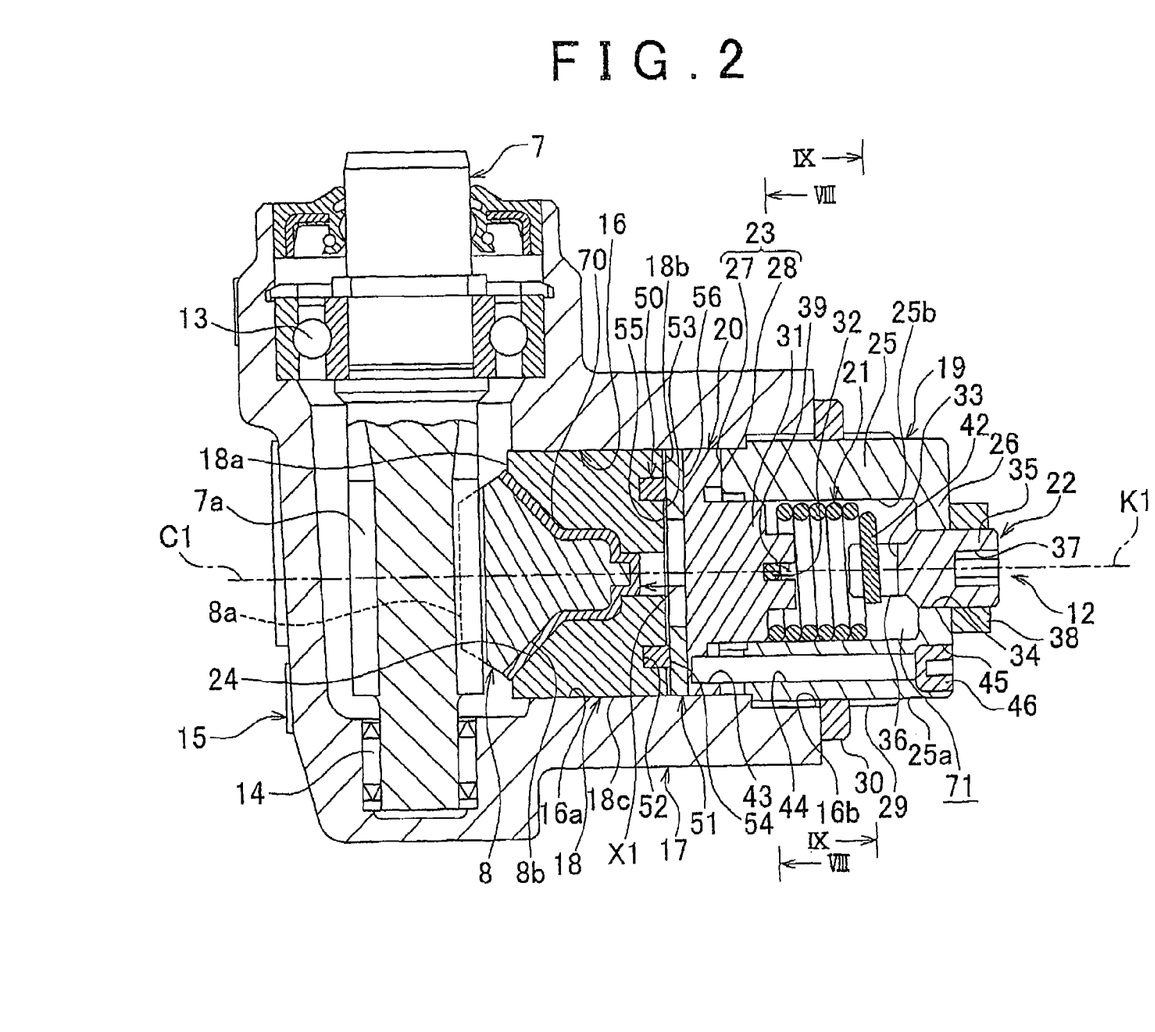
FIG. 2 is a cross-sectional view of the principal portion of a vehicle steering apparatus in which a rack shaft support device is applied.

The rack shaft 8 is supported, so that it can reciprocate linearly along an axial direction Z1, by a plurality of bearings not shown inside a rack housing 9 that is fixed to the vehicle body. Both end portions of the rack shaft 8 protrude to both sides of the rack housing 9 and respective tie rods 10 are joined to each of the end portions. Each tie rod 10 is coupled to a corresponding wheel 11 via a corresponding knuckle arm (not shown).

Where the steering member 2 is operated and the steering shaft 3 is rotated, this rotation is converted by the pinion 7*a* and rack 8*a* into a linear motion of the rack shaft 8 along the transverse direction of the automobile. As a result, steering of the wheel 11 is achieved. With reference to FIG. 2, the pinion shaft 7 is rotatably supported inside a pinion housing 15 by a first bearing 13 composed of, for example, a ball bearing, and a second bearing 14 composed of, for example, a cylindrical roller bearing. The pinion 7*a* of the pinion shaft 7 and the rack 8*a* of the rack shaft 8 are meshed together inside the pinion housing 15.

The vehicle steering apparatus 1 is equipped with a rack shaft support device 12. The rack shaft 8 is axially slidably supported along the axial longitudinal direction thereof (in FIG. 2, the direction perpendicular to the paper sheet) by the rack shaft support device 12 and a bearing (not shown in the figure) provided inside the rack housing 9 (see FIG. 1) coupled to the pinion housing 15. The rack shaft support device 12 is provided with a housing 17 that has a retention hole 16 composed of a round hole, a support yoke 18 serving as a rack shaft support member that is slidably accommodated in the retention hole 16 along a depth direction X1 of the retention hole 16 (axial direction of the retention hole 16), and slidably supports a rear surface 8b of the rack 8a of the rack shaft 8, a sealing member 19 that is fixed by screwing into an inlet port of the retention hole 16, and an intermediate member 20 that is interposed between the support yoke 18 and the sealing member 19 and can rotate about the central axial line C1 of the retention hole 16.

In addition, the rack shaft support device 12 is also provided with a torsion coil spring 21 serving as a torsion spring that torque-transmittably couples the sealing member 19 and intermediate member 20, an adjustment screw 22 in the form of a torsion amount adjusting member that is position-adjustably attached to the sealing member 19 and is for adjusting the torsion amount of the torsion coil spring 21, and a cam mechanism 23 provided on mutually opposing portions of the sealing member 19 and intermediate member 20. The cam mechanism 23 has a function of converting the rotation of the intermediate member 20 caused by untwisting of the torsion coil spring 21 into movement in the axial direction of the intermediate member 20 toward the support yoke 18.

The housing 17 of the rack shaft support device 12 is formed integrally with the pinion housing 15 and disposed on the opposite side from the pinion shaft 7 with the rack shaft 8 interposed there between. The pinion housing 15 and the housing 17 are produced, for example, by die casting. The support yoke 18 serving as a rack shaft support member has a front surface 18a that opposes the rack shaft 8, a rear surface 18b as an opposing surface that opposes the intermediate member 20, and an outer peripheral surface 18c composed of a cylindrical surface. A concave surface 24 that generally matches the shape of the rear surface 8b of the rack shaft 8 is formed on the front surface 18a of the support yoke 18, and a sliding contact plate 70 is attached so as to follow the concave surface 24. The sliding contact plate 70 makes sliding contact with the rear surface 8b of the rack shaft 8. A plate having a low friction coefficient is preferably used for the sliding contact plate 70, and for example, a metal plate or a metal plate covered with a fluororesin can be used as the sliding contact plate.

Figure 3:
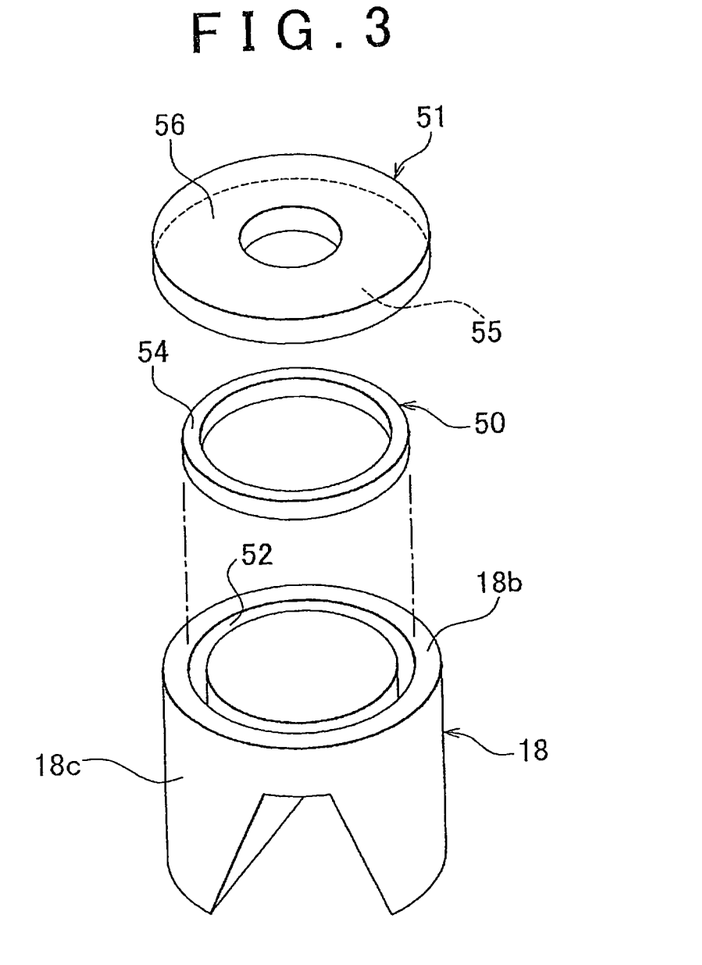
FIG. 3 is an exploded perspective view of an annular plate, an annular elastic member and a support yoke.
Figure 10:
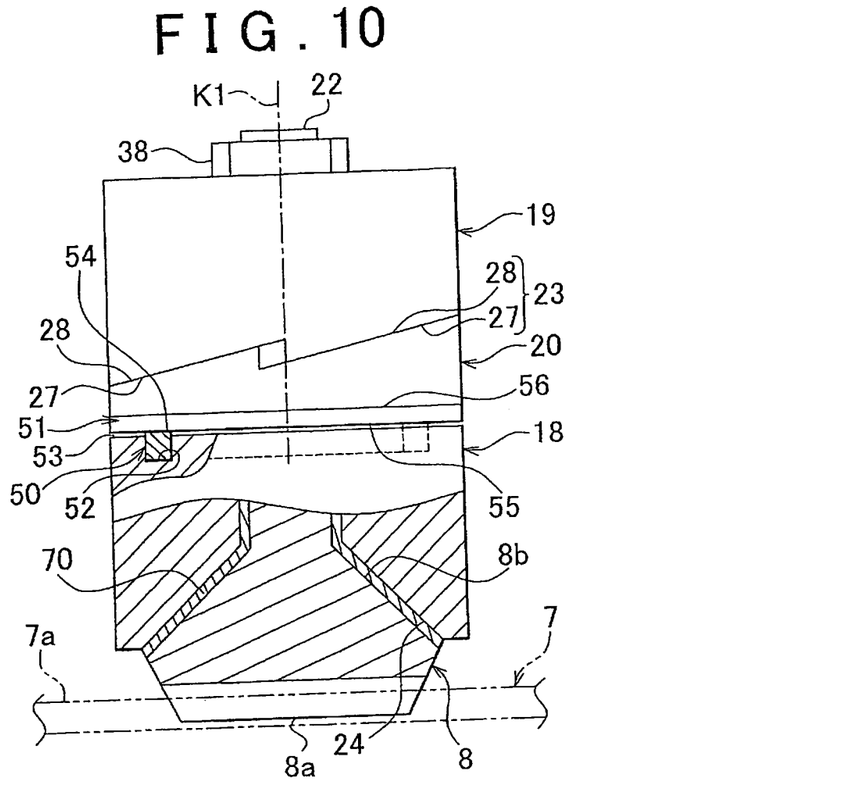
FIG. 10 is a partially cutaway side view of the principal portion of a rack shaft support device.

The rack shaft support device 12 is also provided with an elastic member 50 interposed between the support yoke 18 and the intermediate member 20, and an annular plate 51 interposed between the annular elastic member 50 and the intermediate member 20. The annular plate 51 is an opposing member that opposes the rear surface 18b of the support yoke 18. In other words, the annular plate 51 is a separate entity from the intermediate member 20. With reference to FIGS. 2, 3 and 10, an annular concave portion 52 concentric with the support yoke 18 is formed in the rear surface 18b of the support yoke 18, and the annular elastic member 50 is retained in this annular concave portion 52. A portion of the annular elastic member 50 protrudes from the rear surface 18b of the support yoke 18, and elastically presses the annular plate 51 towards the intermediate member 20. As a result, a gap 53 can be provided between the intermediate member 20 and the support yoke 18, and more specifically, between opposing members in the form of the annular plate 51 and the rear surface 18b of the support yoke 18.

Since fluctuations in meshing between the rack 8a and the pinion 7a can be absorbed by elastic deformation of the annular elastic member 50, there is no excessive accumulation of backlash between the rack 8a and the pinion 7a. Thus, there is also no excessive increase in steering resistance. In addition, when a large load has been input from the rack shaft 8 due to inverse input, the gap 53 disappears accompanying elastic contraction of the annular elastic member 50, thereby making it possible to firmly accept the large load.

Figure 4:
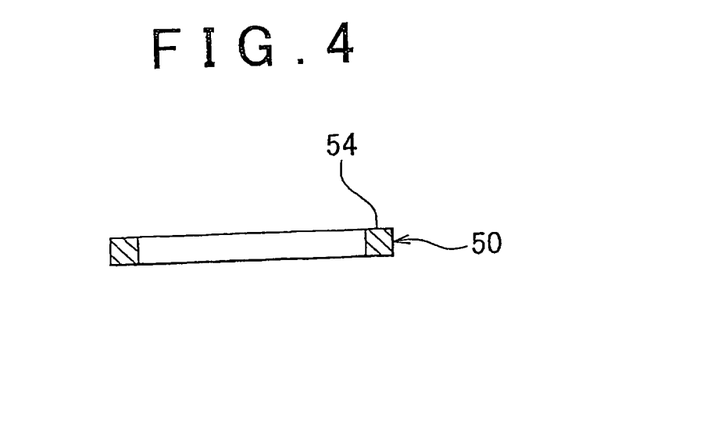
FIG. 4 is a cross-sectional view of an annular elastic member.

The cross-sectional shape of the annular elastic member 50 is that of a quadrangle such as a rectangle as shown in FIG. 4. An annular flat surface 54 of the annular elastic member 50 contacts a first surface 55 to be described later of the annular plate 51. Examples of materials able to be used for the annular elastic member 50 include acrylonitrile butadiene rubber (NBR), hydrogenated acrylonitrile butadiene rubber (H-NBR), acrylic rubber, fluorine rubber and plastic members. A material having comparatively high rubber hardness is preferably used for the annular elastic member, and in the case of using H-NBR, for example, the rubber hardness of the H-NBR may be set to within the range of 85 to 95 Hs.

With reference to FIGS. 2, 3 and 10, the annular plate 51 has the first surface 55 in one axial direction and a second surface 56 in the axial direction opposite that of the first surface 55. The annular plate 51 is composed of, for example, a metal member such as an iron alloy. The first and second surfaces 55 and 56 of the annular plate 51 are composed of flat surfaces. The first surface 55 contacts the flat surface 54 of the annular elastic member 50. In addition, the second surface 56 is finished to have a smoother surface than the first surface 55 by adjusting the surface roughness thereof in order to reduce friction with the intermediate member 20. Namely, the surface properties of the second surface 56 are improved over the surface properties of the first surface 55.

Furthermore, in order to reduce frictional force between the second surface 56 and the intermediate member 20, in addition to improving the surface properties of the second surface 56 beyond the surface properties of the first surface 55 as described above, a coating layer having low friction coefficient may be formed on the second surface 56 by carrying out zinc plating, fluororesin coating or other surface treatment for reducing the friction coefficient. In addition, an annular projection 57 may be provided on the second surface 56 as in the embodiment shown in FIG. 12 to be described later to reduce the surface area over which sliding contact is made between the second surface 56 and the intermediate member 20, or a friction reducing element in the form of a lubricant such as grease may be interposed between the second surface 56 and the intermediate member 20.

Figure 5:
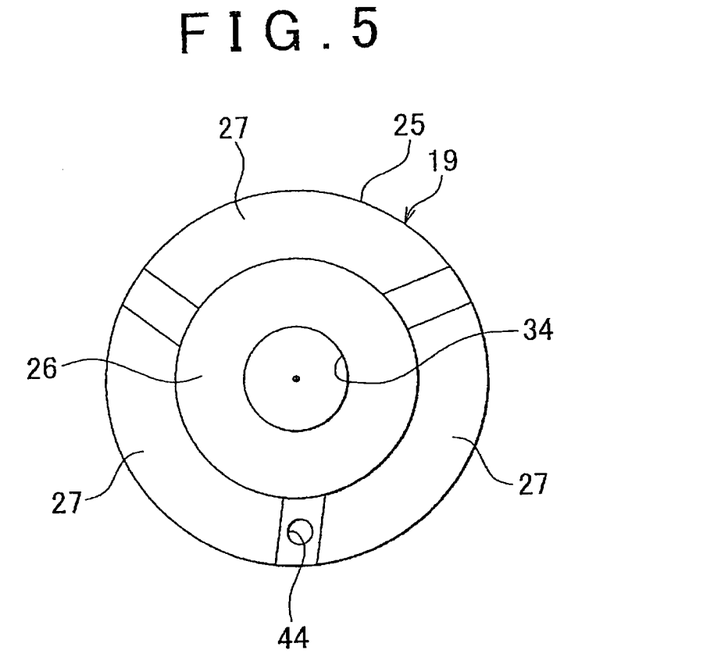
FIG. 5 is a schematic diagram showing an end surface of a sealing member.

The sealing member 19 has a cylindrical portion 25, and an end wall 26 that closes one end of the cylindrical portion 25. With reference to FIGS. 2 and 5, a plurality of cam surfaces 27 are formed on the annular other end of the cylindrical portion 25. As shown in FIG. 5, the plurality of cam surfaces 27 are disposed equidistantly in the circumferential direction of the cylindrical portion 25. The height (in FIG. 5, in the direction perpendicular to the paper sheet) of each cam surface 27 is made to vary along the circumferential direction of the cylindrical portion 25.

Figure 6:
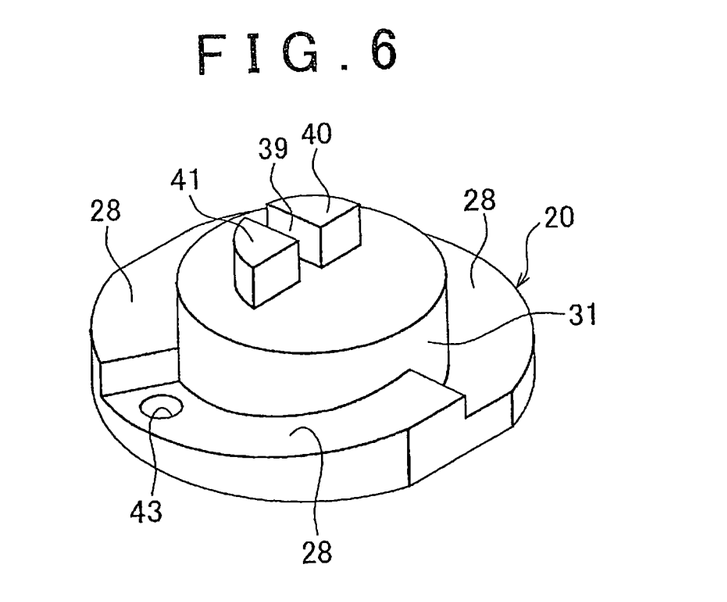
FIG. 6 is a schematic perspective view of an intermediate member.

With reference to FIGS. 2 and 6, the intermediate member 20 has formed therein an annular cam follower surface 28 that opposes the cam surface 27. The above-mentioned cam mechanism 23 is composed of the cam surface 27 and the cam follower 28. Again referring to FIG. 2, a male thread 29 is formed in the outer periphery 25a of the cylindrical portion 25. A female threaded portion 16b is formed in the inner peripheral surface 16a of the retention hole 16 located at the inlet portion of the retention hole 16. The male thread 29 of the sealing member 19 is screwed in and fixed to the female threaded portion 16b. In addition, the sealing member 19 is locked in the housing 17 as a result of a lock nut 30 screwed onto the male thread 29 on the outer periphery of the sealing member 19 being pressed onto end surface of the housing 17.

With reference to FIGS. 2 and 6, the intermediate member 20 has a boss 31 provided on the inside of the annular cam follower surface 28, and this boss 31 relatively rotatably mates with an inner periphery 25b of the cylindrical portion 25. Inside the sealing member 19 having a tubular shape, an accommodation space 71 for accommodating the torsion coil spring 21 is formed between the boss 31 of the intermediate member 20 and the end wall 26 of the sealing member 19.

Figure 7A:
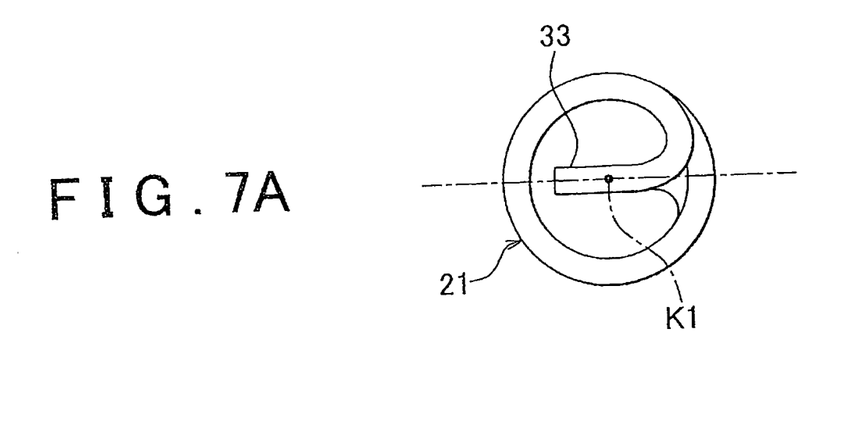
FIG. 7A is an overhead view of a torsion coil spring.
Figure 7B:
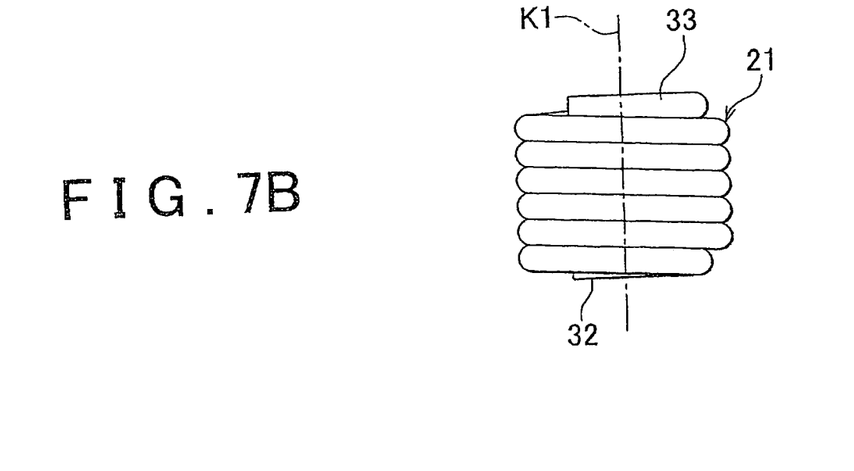
FIG. 7B is a side view of a torsion coil spring.
Figure 7C:
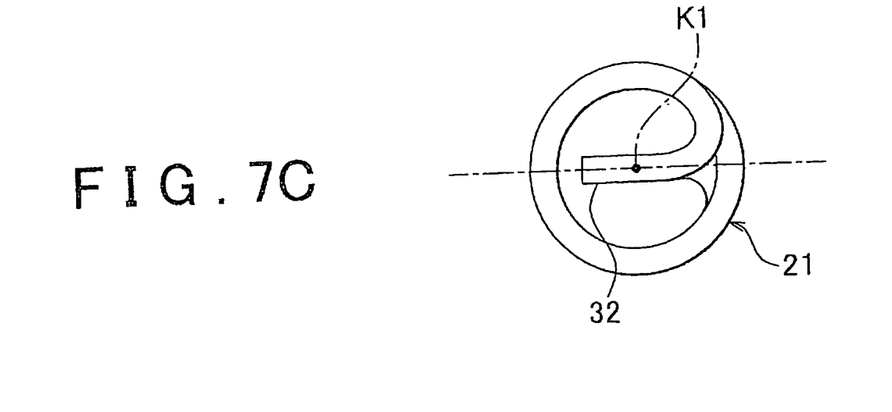
FIG. 7C is a bottom view of a torsion coil spring.

With reference to FIGS. 2, 7A, 7B, and 7C, the torsion coil spring 21 has first and second end portions 32 and 33, and the first and second end portions 32 and 33 are bent linearly inward to be perpendicular to a coil central axial line K1 of the torsion coil spring 21. The first end portion 32 and second end portion 33 may be arranged along each other in the same direction, as shown in FIGS. 7A and 7C, when the torsion coil spring 21 in a free state is viewed along the coil central axial line K1.

With reference to FIG. 2, the adjustment screw 22 serving as a torsion amount adjusting member is screwed into a threaded hole 34 that passes through the end wall 26 of the sealing member 19. The adjustment screw 22 has a first end portion 35 that is exposed to the outside from the end wall 26 of the sealing member 19 and a second end portion 36 that opposes the intermediate member 20 inside the sealing member 19 (namely, inside the accommodation space 71). The first end portion 35 is provided with an operation portion 37 for operating the adjustment screw 22. The operation portion 37 is, for example, composed of a hexagonal hole formed in the first end portion 35.

Figure 8:
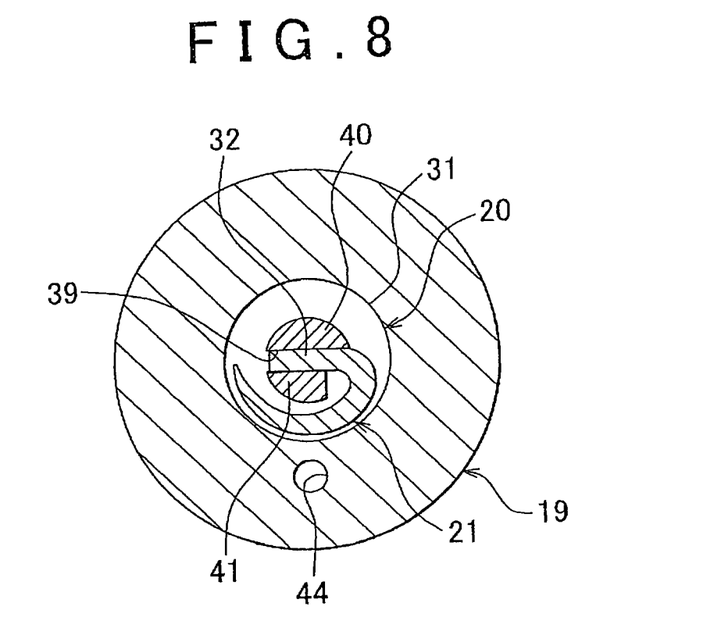
FIG. 8 is a cross-sectional view taken along line VIII-VIII of FIG. 2.

As a result of a lock nut 38 screwed onto the outer periphery of the first end portion 35 of the adjust screw 22 pressing on the end wall 26 of the sealing member 19, the adjustment screw 22 is locked to the sealing member 19. As shown in FIG. 6, a pair of protrusions 40, 41 that delineate there between a coupling groove 39 serving as a coupling portion are formed on the end surface of the boss 31 of the intermediate member 20. As shown in FIG. 8, which is a cross-sectional view taken along line VIII-VIII in FIG. 2, the first end portion 32 of the torsion coil spring 21 is fit into the coupling groove 39, thereby coupling the first end portion 32 of the torsion coil spring 21 and the intermediate member 20 so that they rotate together.

Figure 9:
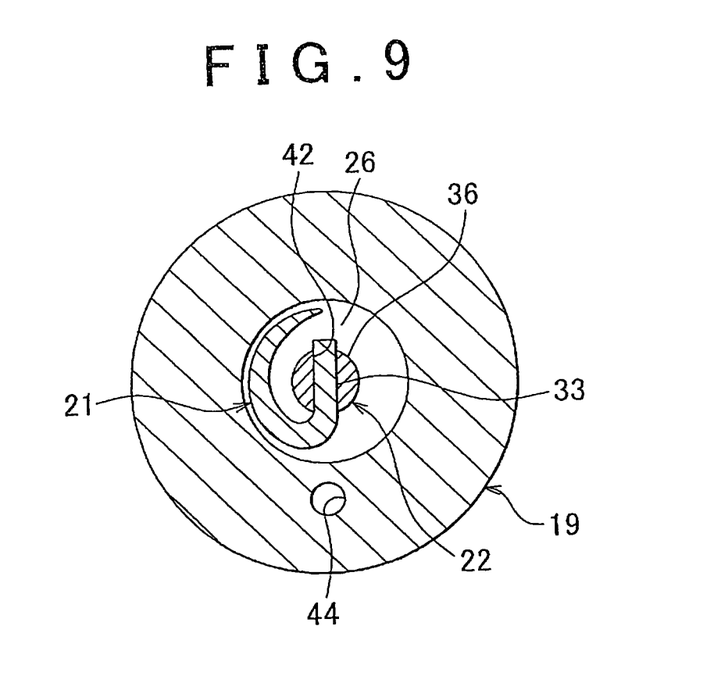
FIG. 9 is a cross-sectional view taken along line IX-IX of FIG. 2.

In addition, as shown in FIG. 2, a coupling groove 42 serving as a coupling portion is formed in the second end portion 36 of the adjustment screw 22. As shown in FIG. 9, which is a cross-sectional view taken along line IX-IX in FIG. 2, the second end portion 33 of the torsion coil spring 21 is fit into the coupling groove 42, thereby coupling the second end portion 33 of the torsion coil spring 21 and the adjustment screw 22 so that they rotate together. As a result of the torsion coil spring 21 untwisting, the intermediate member 20 rotates relative to the sealing member 19, as shown in FIG. 10. As a result, the force induced by the rotation of the intermediate member 20 (rotational force) is converted by the movement of the cam surface 27 and cam follower surface 28 of the cam mechanism 23 into a force by which the intermediate member 20 pushes the support yoke 18 toward the rack shaft 8. More specifically, the intermediate member 20 moves the support yoke 18 in the direction X1 of pushing toward the rack shaft 8.

With reference to FIGS. 2 and 6, in the intermediate member 20, a threaded hole 43 is formed parallel to the central axial line of the intermediate member 20. With reference to FIGS. 2 and 5, a fixing jig insertion hole 44 is formed in the sealing member 19. When the intermediate member 20 is in a prescribed rotated position, the threaded hole 43 of the intermediate member 20 and the fixing jig insertion hole 44 of the sealing member 19 are arranged coaxially in a row.

Figure 11:
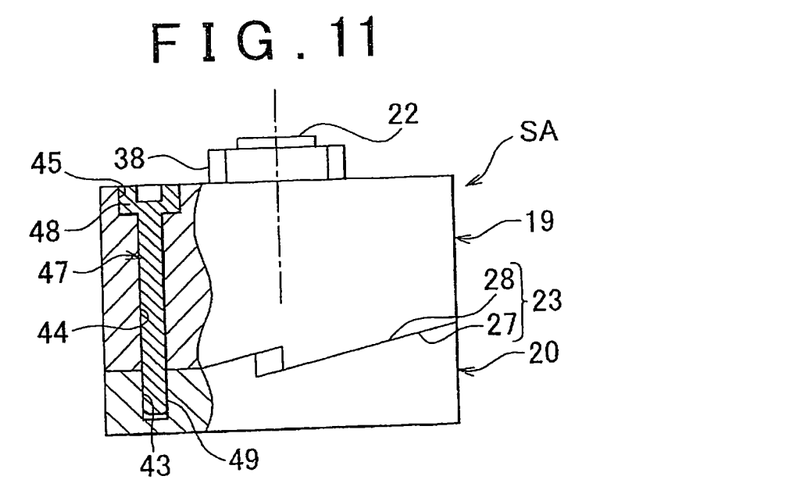
FIG. 11 is a partially cutaway side view of a subassembly (SA) containing a sealing member, an intermediate member, a torsion coil spring and an adjustment screw.

As shown in FIG. 2, a large-diameter portion 45, having an inner diameter larger than the inner diameter of the fixing jig insertion hole 44, is formed in the inlet port of the fixing jig insertion hole 44. A plug 46 is fit into the large-diameter portion 45, thereby blocking the inlet port of the fixing jig insertion hole 44. More specifically, a male thread that composes the plug 46 is screwed into a female thread formed in the inner periphery of the large-diameter portion 45. In an intermediate assembly step of the rack shaft support device 12 (step for adjusting the torsion amount of the torsion coil spring 21 with the adjustment screw 22), as shown in FIG. 11, the sealing member 19 and intermediate member 20 can be fixed to each other by using a fixing tool 47 that has been screwed into the threaded hole 43 through the fixing jig insertion hole 44. More specifically, a SA is composed that includes the fixing tool 47, the sealing member 19, the intermediate member 20, the torsion coil spring 21 (not shown in FIG. 11), and the adjustment screw 22.

The fixing jig 47 is composed of a screw having a head portion 48 and a thread portion 49 formed at the distal end thereof. The fixing jig 47 is inserted through the fixing jig insertion hole 44 of the sealing member 19, and a thread portion 49 at the distal end of the fixing jig 47 is screwed into the threaded hole 43 of the intermediate member. The head portion 48 is received by the bottom of the large-diameter portion 45 of the inlet port of the fixing jig insertion hole 44 of the sealing member. As a result, the sealing member 19 and intermediate member 20 are fixed by the fixing jig 47.

As a result of rotating the adjustment screw 22 by a prescribed amount with the sealing member 19 and the intermediate member 20 fixed by the fixing jig 47 in this manner, the torsion amount of the torsion coil spring 21 located inside the sealing member 19 is adjusted with good accuracy, after which the adjusted adjustment screw 22 is locked using the lock nut 38, the fixing jig 47 is removed, and the plug 46 is attached. According to this embodiment, the intermediate member 20 is rotated by the torsion coil spring 21 accompanying progression of wear of the sliding portion between the support yoke 18 and the rack shaft 8. Accompanying the rotation of the intermediate member 20, since the intermediate member 20 is driven towards the support yoke 18 by the movement of the cam mechanism 23 formed between the sealing member 19 and the intermediate member 20, the pushing force applied to the meshing portion between the rack 8a and the pinion 7a can be maintained roughly constant.

Moreover, between the intermediate member 20 and support yoke 18 fluctuations in meshing between the rack 8a and the pinion 7a can be absorbed by increasing or decreasing the amount of the gap 53 formed between opposing members in the form of the first surface 55 of the annular plate 51 and the rear surface 18b of the support yoke 18 accompanying expansion and contraction of the annular elastic member 50. Thus, even after the intermediate member 20 has been displaced toward the support yoke 18 by the torsion coil spring 21 accompanying progression of wear of the above-mentioned sliding portions, backlash between the rack 8a and the pinion 7a is made to be extremely low, thereby preventing steering resistance from becoming excessively large.

In addition, since the cross-sectional shape of the annular elastic member 50 held in the annular concave portion 52 of the support yoke 18 is quadrangular, and the annular flat surface 54 of the annular elastic member 50 makes sliding contact with the annular plate 51, a large sliding contact surface area can be secured. As a result, permanent set in fatigue of the surface making sliding contact of the annular elastic member 50 can be prevented and the durability of the annular elastic member 50 can be improved. This is particularly preferable with respect to being able to prevent the occurrence of permanent deformation in high-temperature environments.

In addition, since the annular plate 51 is interposed between the intermediate member 20 and the annular elastic member 50, the intermediate member 20 can be rotated stably and smoothly when so required. In addition, the frictional force between a friction reducing element in the form of the second surface 56 of the annular plate 51 and the intermediate member 20 is smaller than the frictional force between the first surface 55 of the annular plate 51 and the annular elastic member 50. Thus, when the intermediate member 20 rotates when required, mutual sliding contact is made between the intermediate member 20 and the second surface 56 of the annular plate 51 having a relatively small frictional force. As a result, the intermediate member 20 can be rotated smoothly when required.

In addition, in a vehicle steering apparatus that uses the rack shaft support device 12, increases in steering resistance can be inhibited by absorbing fluctuations in meshing between the rack and pinion, and the generation of rattling sound can be prevented over a long period of time. In addition, since the torsion amount of the torsion coil spring 21 can be adjusted with the adjustment screw 22 position-adjustably attached to the sealing member 19, the torsional torque generated by the torsion coil spring 21 can be can be managed accurately. Thus, variations in pushing force of the meshing portions of the rack 8a and the pinion 7a can be inhibited.

In addition, as shown in FIG. 2, the adjustment screw 22 screwed into the threaded hole 34 of the sealing member 19 is used as a torsion amount adjusting member that adjusts the torsion amount of the torsion coil spring 21, and the first end portion 35 of the adjustment screw 22 has an operation portion 37 and is exposed to the outside of the sealing member 19. Thus, the torsion amount of the torsion coil spring 21 can be adjusted by operating the adjustment screw 22 from the outside of the sealing member 19 and rotating the second end portion 33 of the torsion coil spring 21. Namely, the torsion amount of the torsion coil spring 21 can be adjusted with good accuracy by adjusting the screwing position of the adjustment screw 22 relative to the threaded hole 34 from the outside.

Moreover, as shown in FIGS. 7A to 7C, the first and second end portions 32 and 33 of the torsion coil spring 21 serving as a torsion spring are respectively bent linearly inward to be perpendicular to a coil central axial line K1 of the torsion coil spring 21. As shown in FIGS. 8 and 9, the first and second end portions 32 and 33 are fit into coupling grooves 39 and 42 of the intermediate member 20 and adjustment screw 22, respectively. Thus, the torsion coil spring 21 can be twisted, without collapsing, about the coil central axial line K1. As a result, variations in torsional torque relative to the torsion amount can be inhibited.

In addition, since the threaded hole 43 of the intermediate member 20 and the fixing jig insertion hole 44 of the sealing member 19 are arranged coaxially in a row when the intermediate member 20 is in a prescribed rotated position, in a step for assembling the rack shaft support device 12, the rotation of the intermediate member 20 relative to the sealing member 19 can be interrupted by using the fixing jig 47 screwed into the threaded hole 43 of the intermediate member 20 through the fixing jig insertion hole 44 of the sealing member 19. In this state, the torsion amount of the torsion coil spring 21 can be adjusted with good accuracy by using the adjustment screw 22 that is position-adjustably attached to the sealing member 19.

Namely, when the torsion amount of the torsion coil spring 21 is adjusted using the adjustment screw 22, the sealing member 19 and intermediate member 20 are fixed without play by the fixing jig 47 and the torsion amount of the torsion coil spring 21 can be adjusted with good accuracy. In particular, since the fixing jig 47 is screwed in the threaded hole 43 of the intermediate member 20, and the sealing member 19 and intermediate member 20 are fixed in the axial direction and direction of rotation, the advantages indicated below are gained.

Assuming a case in which the sealing member 19 and intermediate member 20 are not fixed in the axial direction, when the torsion coil spring 21 is twisted, there is the risk of the sealing member 19 and intermediate member 20 being mutually inclined by a reaction force of the torsion coil spring 21 in the axial direction. In a case where the two members are inclined, since a gap forms between the cam surface 27 and cam follower surface 28 of the cam mechanism 23 and the relative phases of the cam surface 27 and cam follower surface 28 end up shifting, the torsional torque of the torsion coil spring 21 cannot be set with good accuracy.

In contrast in this embodiment, when the torsion coil spring 21 is twisted, the sealing member 19 and intermediate member 20 are not mutually inclined and the cam surface 27 and cam follower surface 28 can be maintained in close contact with each other. Furthermore, there is no shifting of the relative phase between the cam surface 27 and cam follower surface 28. As a result, the torsional torque of the torsion coil spring 21 can be set with good accuracy.

After the torsion amount of the torsion coil spring 21 has been adjusted with the adjustment screw 22, the fixing jig 47 is removed and the inlet port of the fixing jig insertion hole 44 is closed with the plug 46. Thus, moisture or dust is prevented from penetrating into the sealing member 19.

Figure 12:
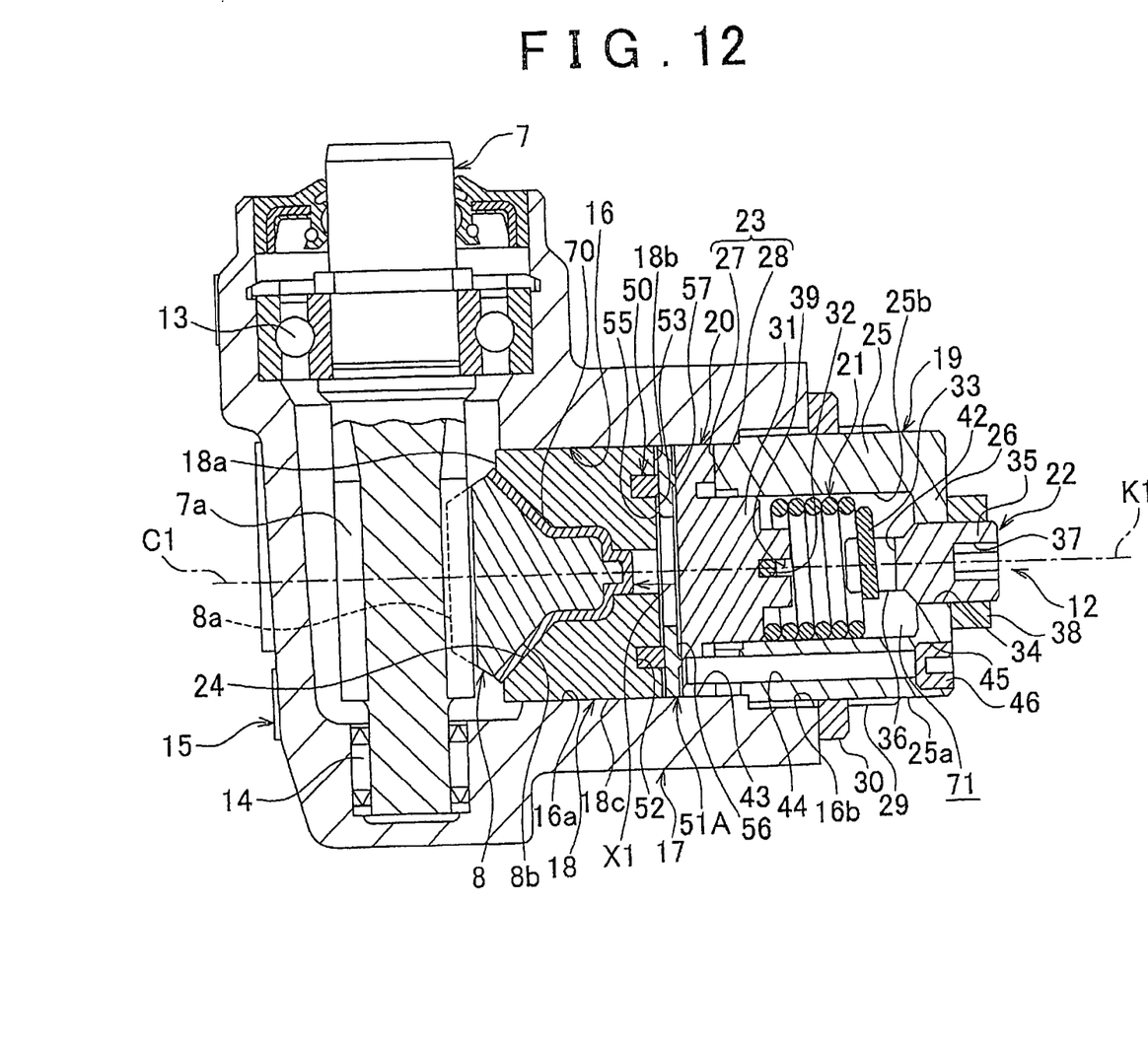
FIG. 12 is a cross-sectional view of the principal portion of a vehicle steering apparatus in which a rack shaft support device of a different embodiment of the invention is applied.

FIG. 12 shows a different embodiment of the invention. With reference to FIG. 12, this embodiment differs from the embodiment of FIG. 2 in that an annular plate 51A is used as an opposing member. An annular projection 57 having a cross-sectional shape in the form of a mountain, for example, is formed on the second surface 56 of the annular plate 51A. The annular projection 57 is formed concentrically with the annular plate 51A and makes sliding contact with the intermediate member 20. The annular projection 57 and the annular elastic member 50 are arranged so that the distance in the radial direction between the annular projection 57 and the central axial line C1 of the retention hole 16 is equal to the distance in the radial direction between the annular elastic member 50 and the central axial line C1 of the retention hole 16. In FIG. 12, the same reference numerals are used to indicate the same constituents as those shown in FIG. 2.

In this embodiment, the surface area over which sliding contact between the annular plate 51A made of a metal such as an iron alloy and the intermediate member 20 similarly made of metal such as an iron alloy when the two make sliding contact can be reduced, thereby making it possible to reduce sliding contact resistance. The same action and effects as those of the embodiment of FIG. 2 can be demonstrated in this embodiment as well. Since the annular plate 51A and the intermediate member 20 are arranged such that the distance in the radial direction between the annular projection 57 and the central axial line C1 of the retention hole 16 and the distance in the radial direction between the annular elastic member 50 and the central axial line C1 of the retention hole 16 are equal, the annular plate 51A does not become inclined and the intermediate member 20 can be rotated more stably when required.

Figure 13:
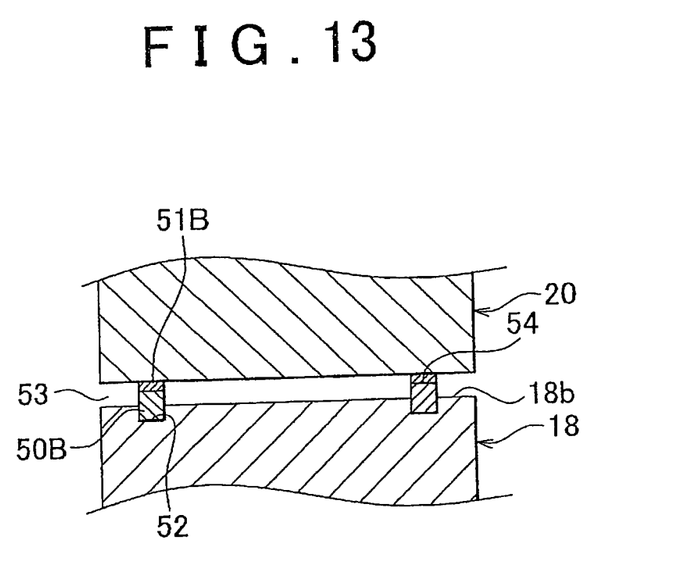
FIG. 13 is a cross-sectional view of the principal portion of a vehicle steering apparatus in which a rack shaft support device of still another embodiment of the invention is applied.
Figure 14:
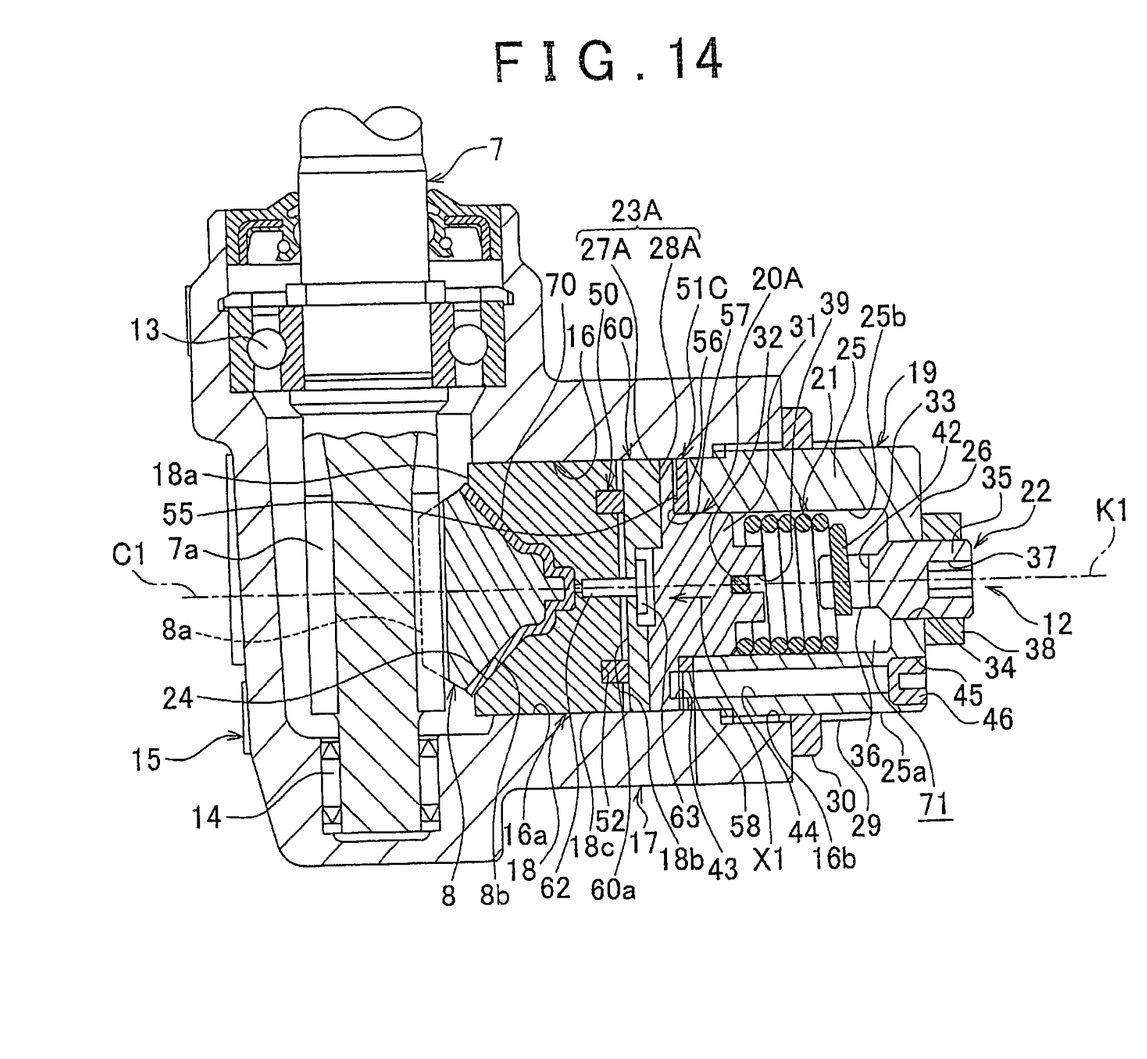
FIG. 14 is a cross-sectional view of the principal portion of a vehicle steering apparatus in which a rack shaft support device of yet still another embodiment of the invention is applied.

Furthermore, the invention is not limited to the embodiments described above, but rather the annular plates 51 and 51A may be omitted, and as shown in FIG. 13, an annular elastic member SOB may be used in which a friction reducing element in the form of a low friction coating layer 51B is coated on the surface thereof. In this case, the opposing portion opposing the rear surface 18b of the support yoke 18 is the front surface of the intermediate member 20 opposing the rear surface 18b of the support yoke 18. In addition, a coating layer 51B for reducing friction is provided on the flat surface 54 of the annular elastic member 50. A fluororesin, for example, can be used for the coating layer 51B. In addition, although the cam mechanism 23 is composed by the cam surface 27 provided on the sealing member 19 and the cam follower surface 28 provided on the intermediate member 20 in the embodiment of FIG. 12, the cam mechanism 23 is not limited thereto. For example, as shown in FIG. 14, a cam follower surface forming member 60 interposed between an intermediate member 20A and the support yoke 18 may be provided separately from the intermediate member 20A, and a cam mechanism 23A may be composed by a cam surface 27A provided on the intermediate member 20A and a cam follower surface 28A formed by the cam follower surface forming member 60. In this case, the cam follower surface forming member 60 is held so that it can slide in the thickness direction X1 of the retention hole 16, but cannot rotate, inside the retention hole 16.

In order to form a gap between the rear surface 18b of the support yoke 18 and an opposing member in opposition thereto in the form of the opposing surface 60a of the cam follower surface forming member 60, the annular elastic member 50 is interposed in an elastically compressed state between the bottom of the annular concave portion 52 of the rear surface 18b of the support yoke 18 and the opposing surface 60a of the cam follower surface forming member 60. In addition, although an opposing member in the form of the annular plate 51A is interposed between the intermediate member 20 and the annular elastic member 50 in the embodiment of FIG. 12, in the embodiment of FIG. 14, an annular plate 51C is interposed between the sealing member 19 and the intermediate member 20A instead of the annular plate 51A. This annular plate 51C functions as a friction reducing element.

Rotation of the intermediate member 20A by the torsion coil spring 21 becomes smooth due to the action of the annular plate 51C. The annular plate 51C has the first surface 55 that opposes the intermediate member 20A and the second surface 56 that opposes the sealing member 19, and the annular projection 57 having a cross-sectional shape in the form of a mountain, for example, is formed on the first surface 55. The annular projection 57 is formed concentric to the annular plate SIC and makes sliding contact with the intermediate member 20A.

In addition, a fixing jig insertion hole 58 that is continuous with the fixing jig insertion hole 44 of the sealing member 19 and the threaded hole 43 of the intermediate member 20A is formed in the annular plate 51C. Thus, the sealing member 19, the annular plate 51C and the intermediate member 20A can be fixed to each other using the above-mentioned fixing jig when adjusting the torsion amount of the torsion coil spring 21. In addition, a shaft-like fixing member 62 fixed in a fixing hole of a concave portion 18d of the support yoke 18 passes through the cam follower surface forming member 60, and the cam follower surface forming member 60 is supported in the axial direction of the fixing member 62 while allowing to move by a prescribed amount. Namely, when an engaging portion 63 formed on an end portion of the fixing member 62 engages with the cam follower surface forming member 60, a gap required to absorb fluctuations is secured between the rear surface 18b of the support yoke 18 the opposing surface 60a of the cam follower surface forming member 60 in opposition thereto. In FIG. 14, the same reference numerals are used to indicate the same constituents as those shown in FIG. 12. Furthermore, the annular projection 57 of the annular plate 51C may be omitted, or the annular plate 51C may be omitted.

Furthermore, the invention is not limited to the above-described embodiments and can be modified in various ways within the scope of the claims. Although the above-described embodiments provided an explanation of examples of being applied to a so-called manual type of vehicle steering apparatus, the invention is not limited thereto, but rather the invention may also be applied to various types of power steering apparatuses (such as so-called column assist types, pinion assist types and rack assist types).

In addition, a transmission ratio variable mechanism capable of varying the ratio of the steering angle of a wheel to the steering angle of a steering member may be provided, and the invention may be applied to a vehicle steering apparatus of the variable transmission ratio type that uses the output of an electric motor for driving the transmission ratio variable mechanism, or to a vehicle steering apparatus of the steer-by-wire type in which a mechanical coupling between a steering member and a wheel is disengaged and the wheel is turned by an output of an electric motor.

What is claimed is:
1. A rack shaft support device, comprising:
a rack shaft support member that is accommodated inside a retention hole formed in a housing so as to be able to slide in an axial direction of the retention hole, and slidably supports a rack shaft, wherein the rack shaft support member includes a front surface that supports the rack shaft and a rear surface located on an opposite side to the front surface in the axial direction of the retention hole;
a sealing member fixed to an inlet port of the retention hole;
an intermediate member that is interposed between the rack shaft support member and the sealing member and can rotate about a central axial line of the retention hole;
a torsion spring that couples the sealing member and the intermediate member and is able to rotationally drive the intermediate member;
a cam mechanism that converts a rotational force of the intermediate member induced by untwisting of the torsion spring to a force by which the intermediate member pushes the rack shaft support member;
an opposing member that opposes the rear surface of the rack shaft support member, the opposing member being separate from the intermediate member and the cam mechanism, the opposing member being provided between the rear surface of the rack shaft support member and the intermediate member, and a site of the opposing member that opposes the intermediate member including a friction reducing element; and
an annular elastic member that is interposed between the rear surface of the rack shaft support member and the opposing member to provide a gap between the rear surface of the rack shaft support member and the opposing member, the annular elastic member being made of elastic material, wherein an entirety of the intermediate member is interposed between the rack shaft support member and the sealing member.

2. The rack shaft support device according to claim 1, wherein
the rack shaft support member has in the rear surface thereof an annular concave portion, and
the annular elastic member, which is held in the annular concave portion, has a quadrangular cross-sectional shape, and has an annular flat surface that opposes the opposing member.

3. The rack shaft support device according to claim 2, wherein
a coating layer that reduces a friction coefficient is provided on the annular flat surface of the annular elastic member that opposes the opposing member.

4. The rack shaft support device according to claim 1, wherein
the friction reducing element is a coating layer that reduces a friction coefficient.

5. The rack shaft support device according to claim 1, wherein
the friction reducing element is a projection provided on the opposing member, and
the projection contacts the intermediate member.

6. The rack shaft support device according to claim 5, wherein
the projection is an annular projection provided in an annular shape relative to a central axial line of the retention hole formed in the housing, and
the projection is provided on the opposing member so that a distance in the radial direction between the annular projection and the central axial line is equal to a distance in the radial direction between the annular elastic member and the central axial line of the retention hole.

7. The rack shaft support device according to claim 1, wherein
the friction reducing element is a lubricant that is interposed between the opposing member and the intermediate member.

8. The rack shaft support device according to claim 1, wherein
the opposing member is an annular plate,
the annular plate respectively includes a first surface and a second surface in the axial direction of the annular plate,
the first surface of the annular plate contacts the annular elastic member,
the second surface of the annular plate contacts the intermediate member, and
a frictional force between the second surface of the annular plate and the intermediate member is smaller than a frictional force between the first surface of the annular plate and the annular elastic member.

9. The rack shaft support device according to claim 1, wherein
the cam mechanism includes a cam surface provided on the intermediate member and a cam follower surface forming member in which a cam follower surface is provided opposite to the cam surface of the intermediate member.

10. The rack shaft support device according to claim 9, wherein
a friction reducing element is interposed between the sealing member and the intermediate member.

11. The rack shaft support device according to claim 10, wherein
the friction reducing element includes an annular plate.

12. The rack shaft support device according to claim 11, wherein
the friction reducing element includes a projection provided on the annular plate.

13. The rack shaft support device according to claim 1, wherein
the rack shaft support device supports the rack shaft of a vehicle steering apparatus so that the rack shaft slides in the axial direction thereof.

14. The rack shaft support device according to claim 1, wherein the elastic material is rubber.

15. The rack shaft support device according to claim 1, wherein the annular elastic member is a round flattened structure.

16. The rack shaft support device according to claim 1, wherein:
the rack shaft support member has in the rear surface thereof an annular concave portion, the annular elastic member being disposed in the annular concave portion, and
a thickness of a cross-section of the annular concave portion is larger than a depth of the annular concave portion, an upper part of the annular elastic member being protruding from an upper part of the annular concave portion when the annular elastic member is disposed in the annular concave portion.

17. The rack shaft support device according to claim 1, further comprising an adjusting member that adjusts a torsion amount of the torsion spring from outside the sealing member.

* * * * *